United States Patent [19]
Gaul

[11] Patent Number: 5,933,991
[45] Date of Patent: Aug. 10, 1999

[54] DECORATIVE ATTACHMENT FOR WIPER DEVICE

[76] Inventor: David W. Gaul, 5826 Covington La., Sarasota, Fla. 34232

[21] Appl. No.: 09/004,202

[22] Filed: Jan. 8, 1998

[51] Int. Cl.[6] ...................................................... G09F 21/04
[52] U.S. Cl. ............................. 40/591; 40/666; 15/250.21
[58] Field of Search ............................. 40/591, 643, 658, 40/660, 666, 411; 15/246, 250.001, 250.21, 250.351; D20/29, 30, 31, 42

[56] References Cited

U.S. PATENT DOCUMENTS

| | | | |
|---|---|---|---|
| 2,387,953 | 10/1945 | Terry | 15/250.001 X |
| 2,799,887 | 7/1957 | Nemic | 15/250.001 X |
| 3,231,951 | 2/1966 | De Armond | 248/475.1 |
| 3,654,718 | 4/1972 | Bianchi | 40/607 |
| 3,969,837 | 7/1976 | Kresse | 40/586 X |
| 4,464,808 | 8/1984 | Berry | 15/257.01 |
| 4,524,533 | 6/1985 | Still, Jr. | 40/607 |
| 4,782,547 | 11/1988 | Mohnach | 15/250.04 |
| 5,479,735 | 1/1996 | Martin, Jr. | 40/643 X |
| 5,715,620 | 2/1998 | Walker | 40/591 |

*Primary Examiner*—Brian K. Green
*Attorney, Agent, or Firm*—Charles J. Prescott

[57] ABSTRACT

A decorative attachment for a wiper device of a vehicle. The wiper device is operably installed with respect to a vehicle rear window for pivotally moving a wiper blade operably connected to and forming a part of the wiper device back and forth in cleaning engagement with the rear window. The decorative wiper attachment includes an elongated, preferably flat display member having viewable indicia printed on one surface thereof and preferably having an edge profile which suggestively enhances a particular viewable impression in conjunction with the printed viewable indicia such as that of a logo or emblem of a college or professional athletic team. Releasable attachments extending from the opposite surface of the display member provide secure releasable attachment with respect to the wiper device around the wiper arm and the wiper blade whereby the decorative attachment remains substantially stationary to the wiper device while the vehicle is under way with the wiper device either stationary or in operation.

1 Claim, 1 Drawing Sheet

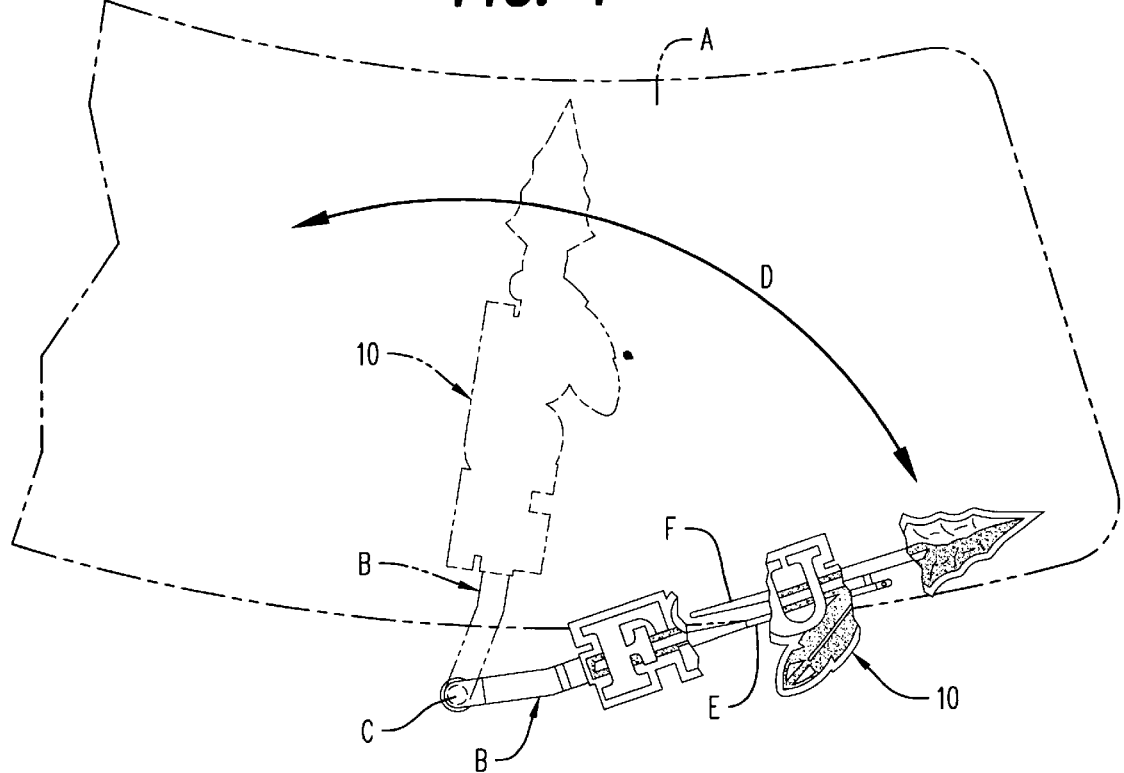
FIG. 1
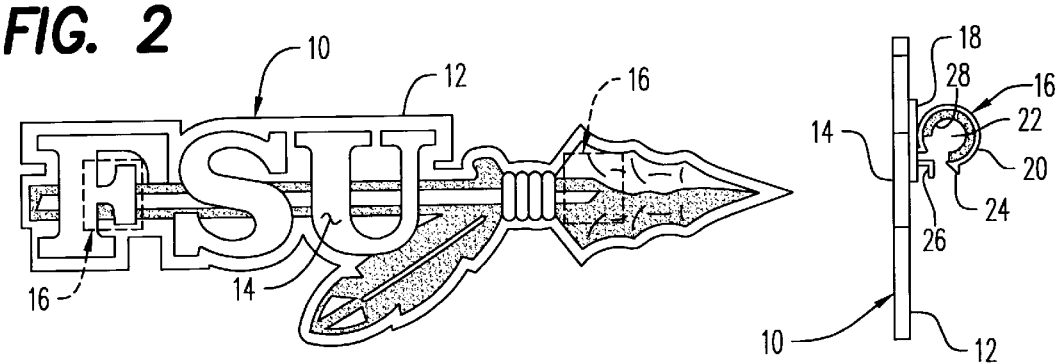
FIG. 2
FIG. 3

DECORATIVE ATTACHMENT FOR WIPER DEVICE

BACKGROUND OF THE INVENTION

Scope of Invention

This invention relates generally to wiper devices mounted to clean a windshield or rear window surface of a vehicle, and more particularly to a decorative attachment for such wiping devices associated with the rear window.

Prior Art

Applicant is unaware of any prior art device associated with or providing the usefulness of a decorative device attachable to a windshield or rear window wiper of a vehicle which will remain substantially connected to the wiping device either when stationary or in wiping operation and whether or not the vehicle is underway. Applicant is aware of the patent to Hoshino disclosed in U.S. Pat. No. 5,651,159 which teaches a wind receiving member attachable to such a wiper device. However, this disclosure appears to be of a permanent nature, rather than being easily releasably attachable and provides no form of decorative viewable indicia associated therewith.

Applicant has also identified head lamp assemblies of vehicles having a wiper arm for selectively cleaning the surface of these side-by-side lamp assemblies invented by Sharpe as taught in U.S. Pat. No. 3,686,704.

BRIEF SUMMARY OF THE INVENTION

This invention is directed to a decorative attachment for a wiper device of a vehicle, the wiper device being operably installed with respect to a vehicle rear window for pivotal movement of a wiper blade operably connected to and forming a part of the wiper arm back and forth in cleaning engagement with the rear window. The decorative wiper attachment includes an elongated, preferably flat display member having viewable indicia printed on one surface thereof and preferably having a profile or edge configuration which suggestively enhances a particular viewable impression of the printed viewable indicia such as the logo of a college or professional athletic team. Releasable attachments extending from the opposite surface of the display member provide secure releasable attachment with respect to the wiper device around the wiper arm and the wiper blade whereby the decorative attachment remains substantially stationary to the wiper device while the vehicle is under way with the wiper device either stationary or in operation.

It is therefore an object of this invention to provide an easily installable and removable decorative attachment for a wiper device operably connected to a vehicle for cleaning the outer surface of a rear window of the vehicle.

It is another object of this invention to provide a decorative attachment for vehicle rear window wiper devices which includes a complementary edge profile and a viewable indicia and which, when attached as desired, will remain attached to the wiper device while the vehicle is underway and even while the wiper device is operational.

In accordance With these and other objects which will become apparent hereinafter, the instant invention will now be described with reference to the accompanying drawings.

BRIEF DESCRIPTION OF THE DRAWINGS

FIG. 1 is a rear elevation broken view of the device attached to a wiper device of a vehicle and in relative position with respect to a rear window (shown in phantom) of the vehicle (not shown).

FIG. 2 is a front elevation view of the device of FIG. 1.

FIG. 3 is an enlarged end elevation view of FIG. 2.

DETAILED DESCRIPTION OF THE INVENTION

Referring now to the drawings, the invention is shown generally at numeral 10 in all views and, additionally, in phantom in FIG. 1. In FIG. 1, the invention 10 is shown in broken fashion releasably attached to a wiper blade F and a wiper arm E of a conventional wiper device B which is pivotally connected at C to a concealed wiper motor and its output shaft (not shown) the vehicle just below the rear window A shown in phantom.

The invention 10 is generally preferably to be associated with the wiper device B of a rear window A such as that found on a van or other similar types of vehicles which may utilize a wiping device B for water and dirt removal therefrom. Although the invention 10 in this configuration of use has been shown to be exceedingly stable while the vehicle is under way and while the wiping device B is in operation, it is presumed that its use in conjunction with a front windshield wiper may be inappropriate.

The device 10 as seen in FIGS. 2 and 3 includes a preferably flat plastic display member 12 which is formed of corrugated sheet plastic for both strength and lightness. The edge profile as best seen in FIGS. 1 and 2 is decorative in nature and complementary to the viewable indicia 14 printed on one surface thereof. A preferred embodiment of the invention 10 would be in conjunction with college or professional athletic team logos and emblems such as that shown, as well as words, emblems and logos associated with businesses, schools and the like. The edge profile of the display member 12 is unsealed so that open corrugations are viewable edgewise thereof for economy, but could easily be fabricated of other suitable rigid or semi-rigid light-weight weather resistant material.

A pair of attaching devices 16 are adhesively attached by base 18 to the opposite or reverse unseen surface of the display member 12 as best seen in FIG. 3. These attachments 16 are well known and are formed of molded plastic having an adhesively covered base 18 which attaches to the reverse surface of the display member 12 in a spaced and aligned relation along the elongated length of the display member 12 as seen in FIG. 2 in hidden lines.

The attachments 16 are formed of molded rigid plastic having a band 20 which is somewhat resilient so that the tanged or barbed distal end 24 may be opened sufficiently to fit around the corresponding wiper blade F and wiper arm E sections and be confined within the interior profile 22 of each of the attachments 16. An inner layer of compressible foam 28 is preferably adhesively attached to the inner surface of each band 20 to prevent rattling. The tangs or barbs 24 releasably lockingly engage into mating edges 26 in a well known fashion.

It is envisioned within the scope of this invention that alternate attachments may be provided such as mating Velcro straps, spring biased clips and other such releasably engageable forms of attachment which will mateably engage around the same corresponding portions of the wiping device B. Being spaced apart as shown in FIG. 2, the attachments 16 provide secure stable connection of the device 10 in the position shown in FIG. 1 without substantial movement under any vehicle or wiping device B operating conditions.

The preferred embodiment of the invention includes a generally flat display member 12. However, it is also envisioned within the scope of this invention that the display member may be of a curved or even cylindrical nature and need not have a profile edge which compatibly enhances the viewable display indicia 14 on the rearwardly facing or obverse surface of the display member.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A decorative viewable display attachment in combination with a wiper device of a vehicle, the wiper device including an elongated wiper arm carrying a wiper blade for being pivotally connected at a proximal end thereof to the vehicle, said viewable attachment comprising:

an elongated rigid or semi-rigid substantially flat display member having a preselected decorative edge profile and visually complementary decorative viewable indicia printed on one surface thereof;

releasable attachments connected to and extending from an opposite surface of said display member and releasably connecting and retaining said display member in close proximity to said wiper device with said one surface facing outwardly from the vehicle, said display member thereby held from substantial relative movement with respect to said wiper device while the vehicle is underway;

one of said releasable attachments positioned adjacent one end of said display member is releasably attached adjacent to a proximal end of the wiper arm, the other of said releasable attachments positioned adjacent another end of said display member is releasably attached adjacent to a distal end of the wiper blade.

* * * * *